United States Patent [19]

Applequist et al.

[11] 4,040,643
[45] Aug. 9, 1977

[54] ADJUSTABLE VEHICLE AXLE

[75] Inventors: Quintin A. Applequist; Laird V. Hawley, both of Salina, Kans.

[73] Assignee: Roberts Industries, Inc., Salina, Kans.

[21] Appl. No.: 622,770

[22] Filed: Oct. 15, 1975

[51] Int. Cl.² ............................................. B62D 63/06
[52] U.S. Cl. ................................. 280/656; 180/DIG. 2
[58] Field of Search ....................... 280/638, 656, 144; 180/9.48, DIG. 2; 301/125, 132, 135, 124 R

[56] References Cited

U.S. PATENT DOCUMENTS

| 1,359,878 | 11/1920 | Dingman | 180/DIG. 2 |
| 1,705,578 | 3/1929 | Lichtenberg | 180/DIG. 2 |
| 2,573,040 | 10/1951 | May | 180/DIG. 2 |
| 3,295,482 | 1/1967 | Dountas et al. | 280/656 X |
| 3,964,565 | 6/1976 | Cagle et al. | 280/638 X |

Primary Examiner—Philip Goodman
Assistant Examiner—Michael J. Forman
Attorney, Agent, or Firm—Fishburn, Gold & Litman

[57] ABSTRACT

A load carrying vehicle such as a grain cart, or the like, and an adjustable axle assembly therefor for selectively changing the spacing of wheels mounted on the axle. The adjustable axle comprises two non-circular end members, and a connector or intermediate member which adjustably attaches the end members to the vehicle frame. The end members each have a shaft or axle attached at one end thereof for rotatably supporting a wheel. The intermediate member has two elongate portions, one of which is fixed to the vehicle and with each having a transversely diverging mid portion to fit and engage the end portions. The intermediate portions when engaged with the end members have side portions spaced apart so when pulled together they clamp the exterior shape of the end members and secure same in selected extended portion. Fastening members secure the two connector members together. Stop members extend from each end member, between the intermediate members and interjacent two adjacent fastening members. When the axle is extended or retracted the stop members will engage the fastening members so as to provide a contracted or extended limit on the amount of axle adjustment.

6 Claims, 4 Drawing Figures

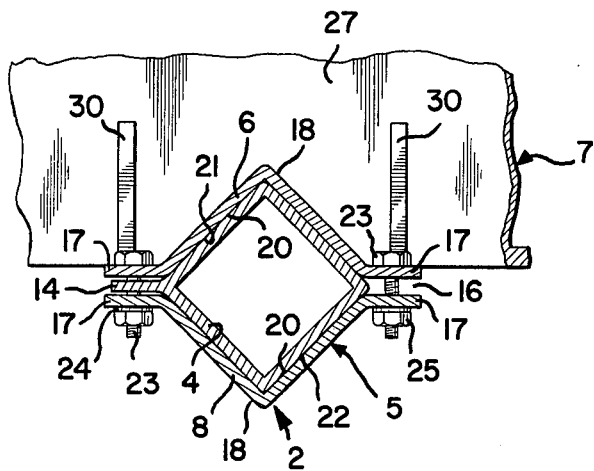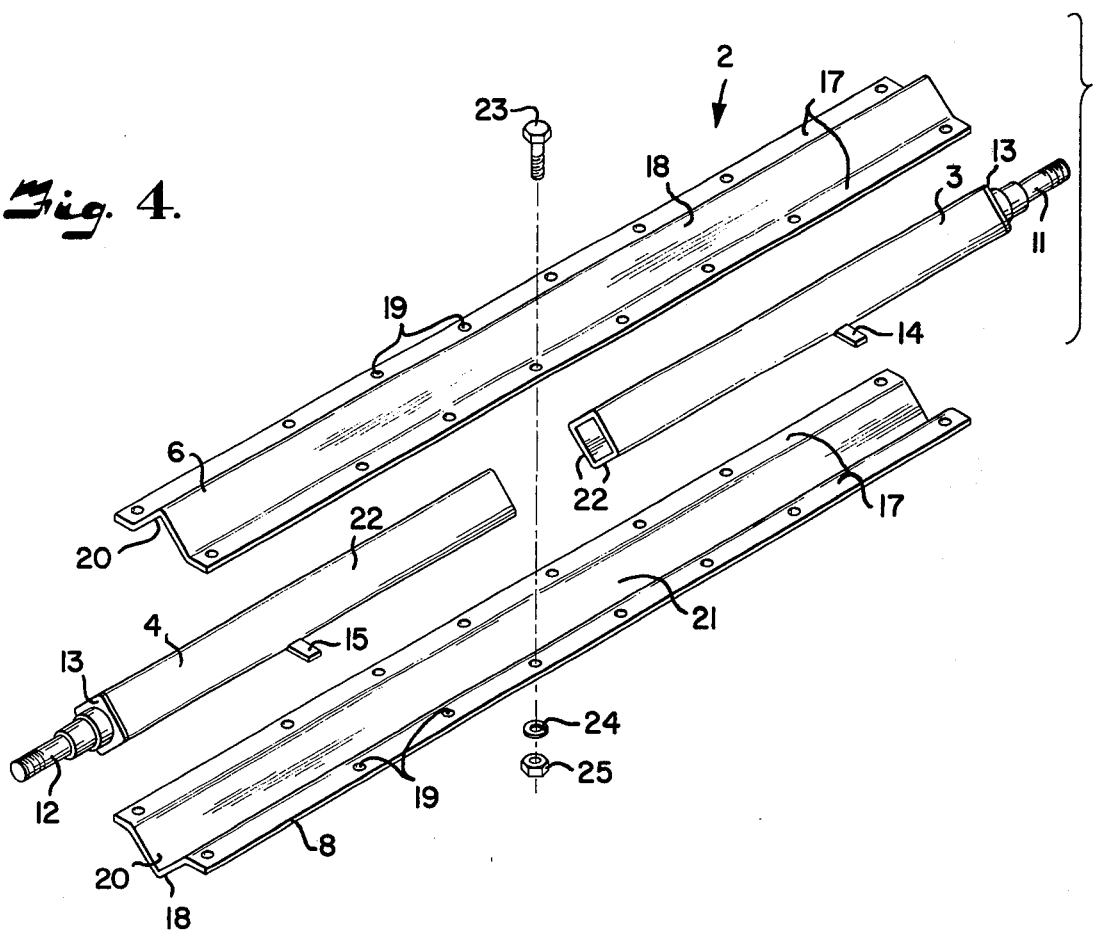

ADJUSTABLE VEHICLE AXLE

This invention relates to load carrying vehicles, such as grain carts and the like, and axles therefor, and more particularly to adjustable axles for such vehicles to provide desired spacing of the vehicle wheels.

Adjustable axles have been used for vehicles, particularly axles for agricultural vehicles such as tractors, implements, and the like. Adjustable axles have provided such vehicles with improved versatility and accommodated row spacing and other requirements. Occasionally these vehicles, such as grain carts, are driven over public highways, for example, when grain is transported from the field directly to a nearby elevator. Many states, however, have statutes which provide that vehicles having an axle width of greater than a specified amount (typically 8 feet) are not allowed to use the highway without special permit. Hence, the agricultural vehicle axle must be capable of complying with such standards. On the other hand, when such vehicles are used to transport produce through the fields, it is often desirable to have the axle width extended, in the order of 10 feet apart, to provide additional stability. This is particularly true when the loads are heavy and the fields or roads are very bumpy. Also, if produce must be transported through fields of growing crops it is desirable to have a vehicle whose axle can be adjusted to coincide with the wheels of the tractor and/or the ridges and furrows of the planted field.

The principal objects of the present invention are: to provide a load carrying vehicle and an adjustable axle assembly therefor having end and intermediate members having cooperating transverse shapes for selective wheel spacing and desirable support for the vehicle; to provide an adjustable axle having intermediate members with cooperating channels therein, the end members seating in the channels for accurate and secure alignment of the wheels; to provide and adjustable axle with an aperture or gap interjacent the intermediate members with fasteners disposed therebetween for clamping the intermediate members together so as to securely grip the seated end members in the intermediate members; to provide an adjustable axle having stop members extending from the surface of the axle members of engaging members of the fasteners to limit movement of the end members relative to the intermediate members transversely of the vehicle; to provide and adjustable axle having novel intermediate members which comprise a portion of the adjustment means which is not impaired by oxidation, dirt, sand, or the like; to provide an adjustable axle which is economical to manufacture, efficient in use, and capable of long operating life and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include exemplary embodiments of the present invention and illustrate various objects and features of the apparatus.

FIG. 3 is a further enlarged vertical, cross-sectional view of the adjustable axle taken along the line 3—3, FIG. 2.

FIG. 4 is an enlarged perspective view of the adjustable vehicle axle in a dissassembled state.

Figure 1:
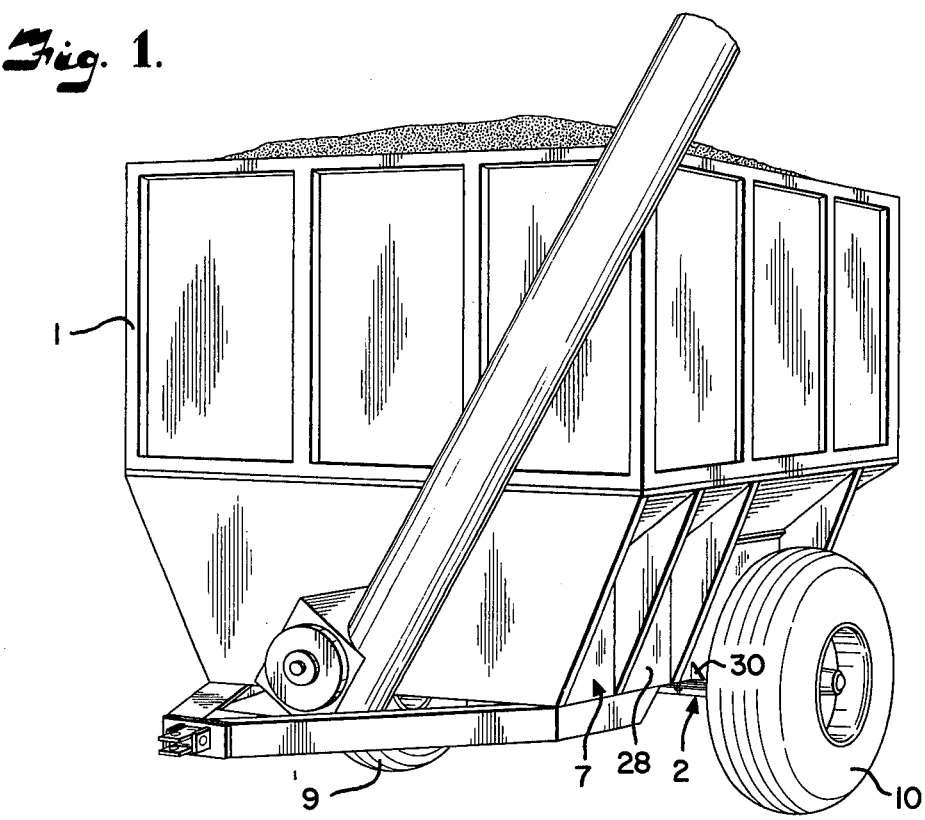
FIG. 1 is a perspective view of a load carrying vehicle, in particular a grain cart, with an adjustable axle assembly therefor.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limited, but merely as a basis for the claims and as a representative basis for teaching one skilled in the art to variously employ the invention in virtually any appropriately detailed structure.

The invention relates to a load carrying vehicle, such as grain cart 1, and an adjustable vehicle axle 2 therefor and includes end members 3 and 4 adjustably secured to an intermediate or connector structure 5 which has one portion 6 preferably fixed to the vehicle body or frame structure 7. The intermediate structure 5 has a fixed portion 6 and a clamping portion 8 to selectively and clampingly engage with end members 3 and 4 to align and hold the end members in position to operatively receive wheels 9 and 10 and have same at selective lateral or transverse spacing.

The end members 3 and 4 are elongated structures preferably non-circular so as to be keyed to the intermediate structure 5, and in the illustrated structure, said end members have a square, tubular body and a shaft or axle 11 and 12 attached to one end thereof, preferably at its center. The end members 3 and 4 are preferably constructed from a strong rigid material, such a steel. The functions of the end members can be achieved with some variation upon the illustrated shape. Hollow or solid end members, with shapes such as triangular, ovate, or polygonal can be used. However, the square tubular shape is particularly well adapted for the intended use. The V-shape assures that the end members will be accurately aligned with respect to each other and to the vehicle. It also provides secure clamping contact with sufficient surface area engagement and pressure that the frictional forces which develop therebetween securely grip the end members and hold same in selected extended position even over bumpy roads and while carrying heavy loads. The V-shape provides a structurally rigid, compact and lightweight axle capable of withstanding high bending loads without experiencing inelastic deformation. The end members each have a plate 13 at one end, from which the axles 11 and 12 extend. The axles are provided with surfaces on which a bearing, hub and wheel are mounted. The axles are rigidly fixed to the end members by means such as welding. Stop members or lugs 14 ans 15 are attached to an exterior corner of the end members 3 and 4 and protrude outwardly along a horizontal plane therefrom. The stop lugs are preferably rectangular in shape and of a thickness such that they can easily translate in an aperture or gap 16 formed between the flanges 17 of the intermediate structure 5.

The intermediate structure 5 is elongated, having first and second cooperating intermediate members 6 and 8 extending transversely of the vehicle body 7. Each of the intermediate members has a flange 17 at both longitudinal edges of the members. Both flanges are coplanar and extend outwardly from the mid-section 18 of the member. The flanges 17 are provided with a plurality of perpendicularly disposed fastener apertures 19 which are spaced apart in a regular fashion. The apertures 19 on each flange are substantially indentical in shape and disposition, such that the apertures in the first and second intermediate members 6 and 8 vertically align. The mid-section 18 has a transverse channel 20 therein which is illustrated as being V-shaped at an angle of 90° to wherein a corner and adjacent sides of the square end members 3 are seated. If the end members' shape is varied, the shape of the intermediate member would also be varied to provide mating surfaces therewith. The interior surfaces 21 of the mid-section 18 are slightly shorter than the exterior faces 22 of the end members such that when assembled, the lower planar surface of the flanges 17 does not pass through the central axis of the end member. Hence, a gap or aperture 16 exists between the flanges 17 on both sides of the adjustable axle. Fasteners, such as bolts 23, are disposed in the apertures 19 of the first intermediate member 6 and extend through the apertures in the second intermediate member 8, thus bridging the gap or aperture 16. Lock washers 24 and nuts 25 are provided on one end of the bolts. By tightening the bolts, the intermediate members are drawn toward each other, nonabuttingly clamping the seated end members therebetween. The first intermediate member 6 is rigidly fixed to the vehicle body 7 having its transverse channel 20 facing downwardly. Two longitudinal body frame members 27 and 28 disposed on either side of the vehicle are rigidly attached to the first intermediate member by means such as welding. The frame members 27 and 28 have V-shaped apertures in which the upper portion of the mid-section 18 of the first intermediate member 6 is disposed and attached. The ends of the frame members are L-shaped and are disposed abuttingly on the upper surface of the flanges 17 and are rigidly attached thereto. Inner support gussets 29 are attached to the frame members inner portion at one end and to the mid-section 18 of the first intermediate member 6 at the other end. A pair of outer support gussets 30, triangular in shape, are attached to the frame memers 27 and 28 and to the flange 17 at the intersection of said members so as to rigidly secure their connection.

Figure 2:
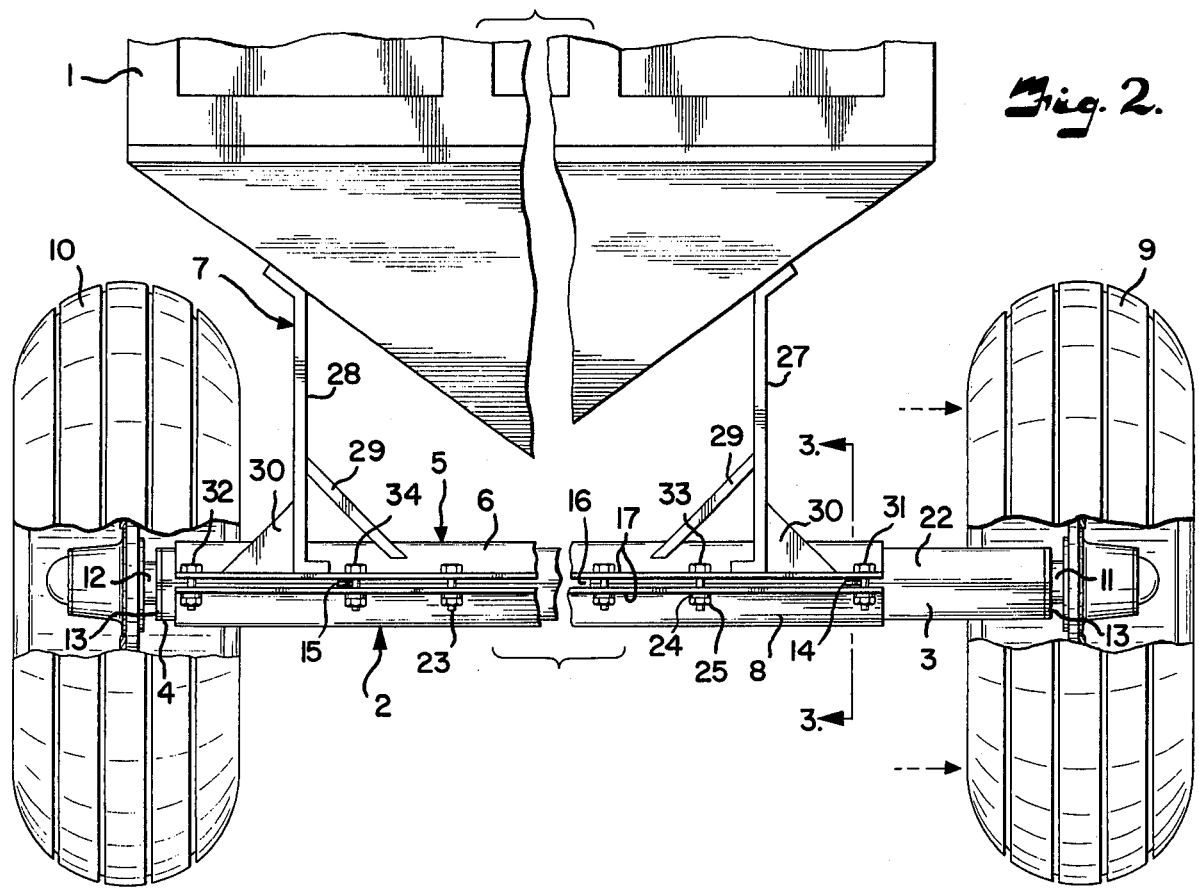
FIG. 2 is an enlarged fragmentary rear end view of the grain cart with the adjustable axle assembly shown in the extended position on the side and the retracted position shown on the other side.

In use, the adjustable vehicle axle can be extended or shortened in the following manner:

Weight is removed from the wheels 9 and 10 by using a jack or similar means. The bolts 23 are loosened and the wheels are pulled outwardly, for example as illustrated by the arrows in FIG. 2, until the desired width is achieved, or until stop lugs 14 and 15 abut the outermost fasteners 31 and 32. Since the connector 5 is a two piece structure with a gap 16 between the pieces, the axle will not rust solidly like the telescoping, prior art devices. Although the members of the adjustable axle may axidize, such oxidation will not render the axle members immovable because when the bolts 23 are loosened, the end member 3 and 4 are horizontally free and most importantly, verically movable in the intermediate structure 5. Hence, rust particles, dirt, sand and the like will not cause the end members to be immovable in the intermediate structure 5 and can be easily removed by means, such as a vacuum, or air pressure. Even though the intermediate structure 5 is of a split construction to achieve the above feature, the preferred square, tubular shape of the end members provides an adjustable axle which is very rigid. The fasteners are then tightened securely, clamping the end members 3 and 4 therebetween, and the jack is released, thereby completing the adjustment procedure. The stop lugs 14 and 15 in cooperation with the fastening members 23, prevent the axle from being extended outwardly to such a distance which would cause the end members to be insecurely clamped in the intermediate member. When the wheels 9 and 10 are fully retracted, the free ends of the extendible end members 3 and 4 are adjacent and form a small aperture therein between, and the stop lugs 14 and 15 abut the second most outwardly fasteners 33 and 34 so as to prevent further shortening of the axle.

It is to be understood that while we have illustrated and described certain forms of our invention it is not to be limited to the specific forms or arrangements of parts herein shown and described.

What we claim and desire to be secured by Letters Patent is:

1. In a load carrying vehicle having a body and wheels, an apparatus for adjustable, lateral spacing of the wheels, including:
    a. an axle assembly having elongate, cooperating, first and second intermediate members extending transversely of the vehicle body;
    b. said first intermediate member being fixed to the vehicle body, and said first and second intermediate members each having a channel therein, extending transversely of said vehicle body and in facing relation, each channel having first and second planar, diverging surfaces which meet at an apex;
    c. first and second end members having portions at one end thereof with wheels rotatably mounted thereon and elongate portions extending between said intermediate members, said elongate portions of said end members each having opposed planar faces and substantially mating with the diverging surfaces of each channel and seating therein at opposing ends of said axle assembly, said elongate portions selectively telescoping within said channels;
    d. spaced means adjustably connecting said first and second intermediate members and drawing said second intermediate member toward the first intermediate member, and securing said elongate portion of each of said end members by clamping the same between said intermediate members; and
    e. said first intermediate member being attached to said vehicle in a manner whereby a line connecting each channel apex is, in an operational position, disposed in a normally, substantially vertical orientation.

2. Apparatus as set forth in claim 1 including:
    a. cooperative engaging means disposed on the elongate portion of each of said end members and said intermediate members and limiting endwise movement of said end members relative to said intermediate members.

3. Apparatus as set forth in claim 1 wherein:
    a. the elongate portions of said end members have a transverse cross-section with the opposed planar faces forming opposed V-shaped portions and the diverging surfaces of each channel in each of said intermediate members define V-shapes seating said elongate portions of said end members therein.

4. In a load carrying vehicle having a body and wheels, an apparatus for adjustable, lateral spacing of the wheels, including:

a. an axle assembly having elongate, cooperating, first and second intermediate members extending transversely of the vehicle body;
b. said first intermediate member being fixed to the vehicle body, and said first and second intermediate member having a transverse channel therebetween;
c. elongate end members having portions at one end thereof with wheels rotatably mounted thereon, said end members seating in the transverse channel between said first and second intermediate members;

spaced means adjustably connecting said first and second intermediate members for clamping said end members therebetween, where said spaced means comprises:
   1. a flange at each longitudinal edge of said intermediate members with said spaced transverse apertures disposed therethrough. the apertures in each of said intermediate members being cooperating and aligning;
   2. a gap defined by the space between adjacent flanges when said end members are seated in said intermediate members; and
   3. fasteners extending through the apertures in said intermediate members and bridging said gap so as to adjustably draw said intermediate members toward each other into non-abutting clamping of said seated end members therebetween; and
e. cooperative engaging means on said end members and said intermediate members to limit transverse movement of said end members relative to said intermediate members, said engaging means comprising:
   1. first and second stop lugs, extending outwardly from the surface of said end members, between adjacent flanges and longitudinally interjacent a first and second, and a third and fourth fastener respectively, for engaging contact therewith.

5. In a load vehicle having a body, comprising:
a. laterally spaced longitudinally extending frame members in a vehicle body and having trnsversely aligned downwardly opening angular recesses therein;
b. an axle intermediate member being angular in cross-section and engaged in said recesses, said intermediate member having a downwardly opening inverted V-shaped channel extending longitudinally thereof and opening at each end thereof;
c. means connecting said frame members and said intermediate axle member to fix same together with said intermediate member forming a transverse frame member;
d. axle end members each having a portion rotatably mounting a ground engaging wheel, and axle end portion being at each end of said intermediate member, said axle end members each having an elongate portion seating in said channel of the intermediate member, and selectively telescoping longitudinally therein to adjust the lateral spacing between the wheels;
e. an elongate keeper engaged under the elongate axle portions and secured relative to said intermediate axle member for clamping the elongate axle portion to said inermediate member and retaining same in adjusted position;
f. said elongate keeper being angular in cross-section and having an upwardly opening channel of V-shaped cross-section; and
g. said elongate axle portions having opposed faces defining angular shapes for seating in the channel of the intermediate axle member and keeper.

6. In a load carrying vehicle as set forth in claim 5 and including:
a. said intermediate member and keeper having adjacent longitudinal edge portions spaced apart when seatingly engaged with said elongate axle portions
b. the securing of the keeper to the intermediate member being by a plurality of spaced fastener members engaging said edge portions and adjustable to selectively clamp the axle elongate portions; and
c. abutments on said axle elongate portions and said intermediate axle member engageable to define limits of lateral spacing of the wheels.

* * * * *